United States Patent
Cardona et al.

(10) Patent No.: US 7,275,175 B2
(45) Date of Patent: *Sep. 25, 2007

(54) METHOD AND APPARATUS FOR HIGH-SPEED NETWORK ADAPTER FAILOVER

(75) Inventors: Omar Cardona, Austin, TX (US); James Brian Cunningham, Austin, TX (US); Shouchun Li, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

This patent is subject to a terminal disclaimer.

(21) Appl. No.: 10/897,356

(22) Filed: Jul. 22, 2004

(65) Prior Publication Data

US 2006/0020854 A1    Jan. 26, 2006

(51) Int. Cl.
   *G06F 11/00*       (2006.01)
(52) U.S. Cl. ......................................................... 714/4
(58) Field of Classification Search .................... 714/4
   See application file for complete search history.

(56) References Cited

U.S. PATENT DOCUMENTS 6,078,957 A * 6/2000 Adelman et al. ........... 709/224
6,108,300 A * 8/2000 Coile et al. ................. 370/217
2003/0223466 A1* 12/2003 Noronha et al. ............ 370/537
2003/0237018 A1* 12/2003 Baba ............................. 714/4
2004/0085893 A1* 5/2004 Wang et al. ................ 370/216
2005/0010837 A1* 1/2005 Gallagher et al. .......... 714/100
2005/0259632 A1* 11/2005 Malpani et al. ............. 370/351

FOREIGN PATENT DOCUMENTS

JP         2001268092 A  *  9/2001

OTHER PUBLICATIONS http://www.syskonnect.com/syskonnect/products/sk-98xx.htm, pp. 1-4; Jun. 14, 2004; SysKonnect GmbH—Gigabit Ethernet Products SK-98xx; "SysKonnect Gigabit Ethernet Server Adapters".
http://publib-b.boulder.ibm.com/Redbooks.nsf/RedbookAbstracts/tips0264.html?Open, Jun. 4, 2004; IBM Redbooks, "Deploying Oracle 9i RAC on AIX—Two Configuration Options", pp. 1-2.
http://www.tu-darmstadt.de/hrz/unix/ibm/documentation/HACMP/install/appa.html, Jun. 4, 2004; "Appendix A: Supporting IP Address Takeover", pp. 1-3.

* cited by examiner

*Primary Examiner*—Michael Maskulinski
(74) *Attorney, Agent, or Firm*—Duke W. Yee; Marilyn Smith Dawkins; Peter B. Manzo

(57) ABSTRACT

A method, apparatus, and computer instructions for facilitating failover between network adapters. A failure of a first network adapter is detected in a device driver layer. In response to detecting the failure, the transmission of data is changed by the device driver layer to a second network adapter.

32 Claims, 2 Drawing Sheets

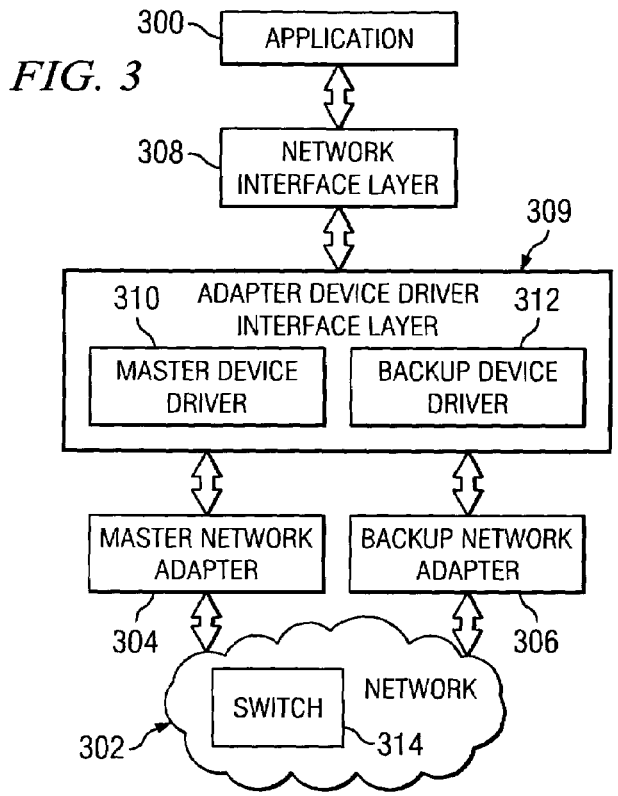
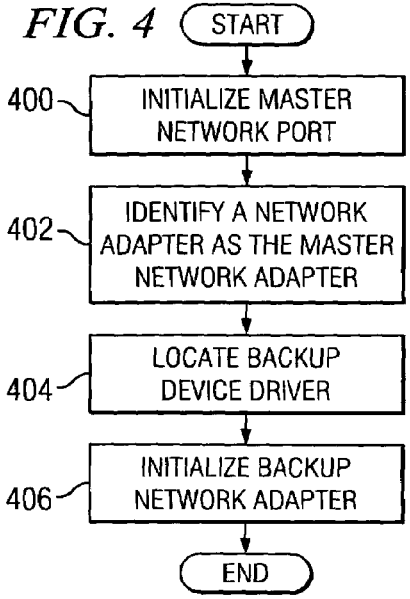
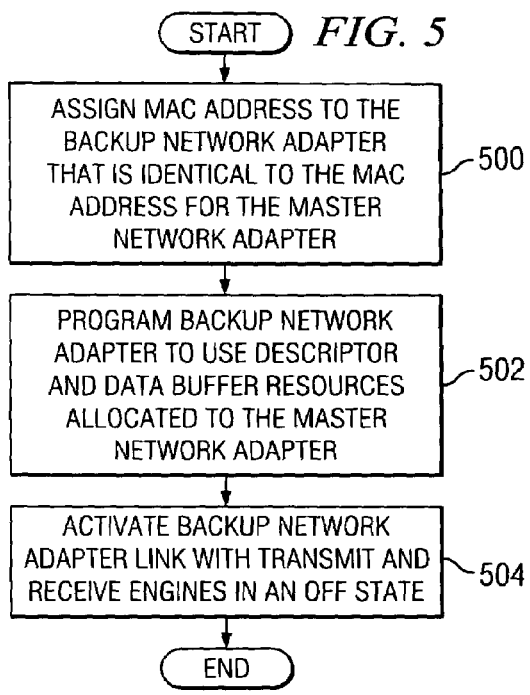
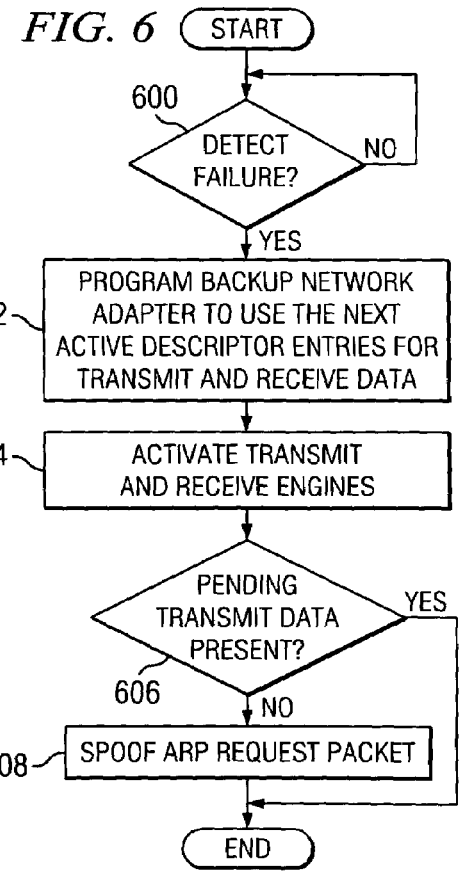

METHOD AND APPARATUS FOR HIGH-SPEED NETWORK ADAPTER FAILOVER

BACKGROUND OF THE INVENTION

1. Technical Field

The present invention relates generally to an improved data processing system and in particular to a method and apparatus for managing components in a data processing system. Still more particularly, the present invention relates to a method, apparatus, and computer program product for a failover process for network adapters.

2. Description of Related Art

In many computer systems, such as server data processing systems, the availability of network connections is crucial. These network connections also are referred to as links. In these types of systems, a backup network adapter is often present in addition to the primary or master network adapter. If the master network adapter fails, the server may switch over and use the backup network adapter. This switching of adapters is also called a failover action.

In some customer environments, the ability to rapidly switch to a backup network adapter interface in the event of a link failure is an absolute requirement. These customers are typically running highly specialized applications, such as real-time data gathering, and require failover times to be in the sub-millisecond range. In the past, certain network solutions, such as dual-ring fiber distributed data interface (FDDI), facilitated this rapid failover capability at the network adapter hardware layer. As these customers migrate from FDDI technology to other network technologies such as Gigabit Ethernet, their failover requirements remain constant. However, other network technologies do not currently define or implement a similar rapid failover capability such as dual rings.

Current software-based solutions to this problem include: the Advance Interactive Executive (AIX), Etherchannel Failover technology, and High Availability Cluster Multi-Processing (HACMP) network address takeover. Both of these solutions fall far short of the millisecond failover time required by certain customers because of inherent design limitations in the solutions.

One available hardware-based solution is a two-port Gigabit Ethernet network adapter solution. This solution consists of a two-port Gigabit Ethernet adapter with specialized adapter firmware that implements rapid port failover in the sub-millisecond range. However, this system is a highly specialized and relatively expensive solution.

Therefore, it would be advantageous to have an improved method, apparatus, and computer instructions for providing a high-speed failover network adapter system without requiring specialized and expensive hardware.

SUMMARY OF THE INVENTION

The present invention provides a method, apparatus, and computer instructions for facilitating failover between network adapters. A failure of a first network adapter is detected in a device driver layer. In response to detecting the failure, the transmission of data is changed by the device driver layer to a second network adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used for providing high-speed network adapter failover in accordance with a preferred embodiment of the present invention;

FIG. 4 is a flowchart of a process for initializing network adapters in accordance with a preferred embodiment of the present invention;

FIG. 5 is a flowchart of a process for initializing a backup network adapter in accordance with a preferred embodiment of the present invention; and FIG. 6 is a flowchart of a process for performing a failover action in accordance with a preferred embodiment of the present invention.

DETAILED DESCRIPTION OF THE PREFERRED EMBODIMENT

Figure 1:
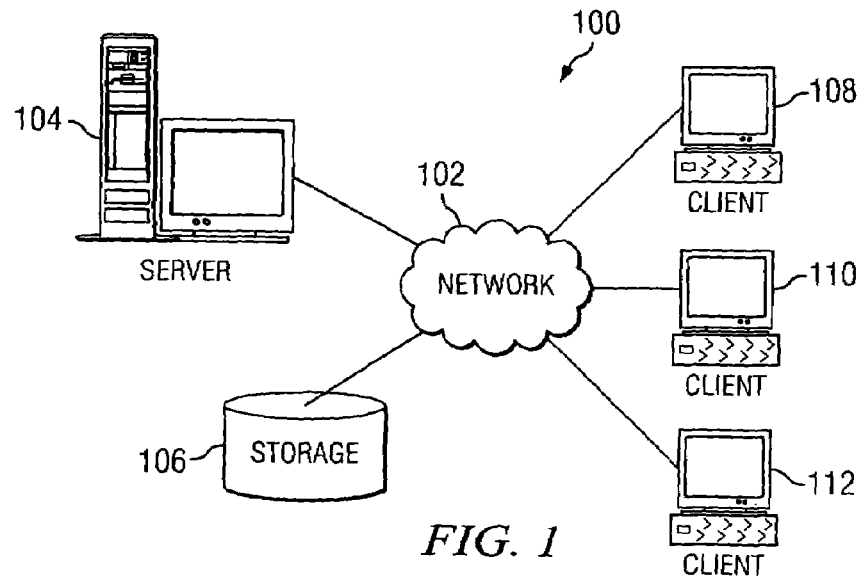
FIG. 1 is a pictorial representation of a network of a data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

The present invention may be implemented in a data processing system such as server 104 or client 108. In particular, a failover mechanism is provided in a device driver layer to perform a failover action when a primary or master network adapter fails. The failover action changes the transmission of data to the secondary or backup network adapter.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
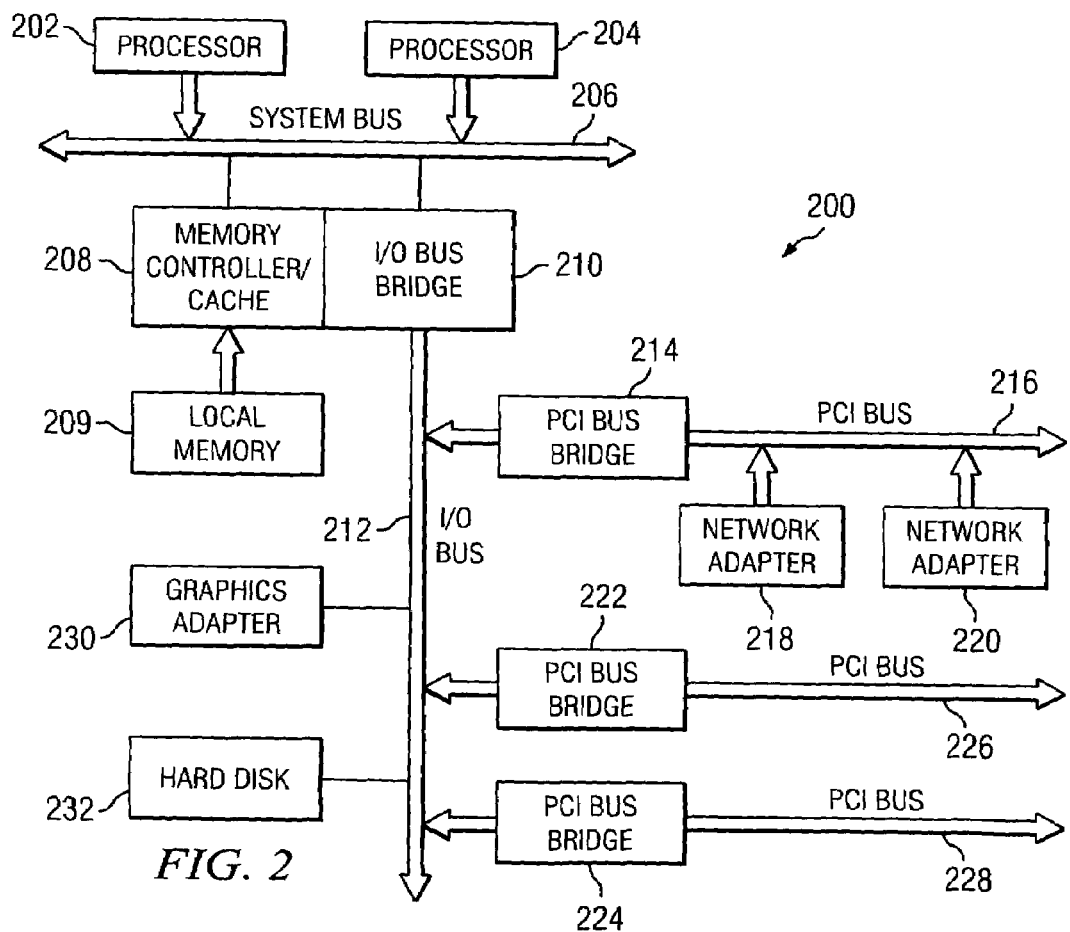
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 has a client, such as client 108 in FIG. 1.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through network adapter 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the AIX operating system or LINUX operating system.

The present invention recognizes that a number of software products are present on the market that claim to support "active port failover". None of these products, however, claim a failover time under one millisecond. All existing software products implement failover functionality in a layer above the adapter device driver layer, which ultimately increases the failover time.

In contrast, the present invention implements its process in the device driver layer, reducing the failover time. With reference now to FIG. 3, a diagram illustrating components used for providing high-speed network adapter failover is depicted in accordance with a preferred embodiment of the present invention. In this illustrative example, application 300 may use a link or network connection to transfer data to and from network 302.

The transfer of data is facilitated through the use of master network adapter 304 and backup network adapter 306. The data is transferred to these network adapters through network interface layer 308 to adapter device driver layer 309. Adapter device driver layer 309 is a layer in which failover occurs in these illustrative examples. This layer contains master device driver 310 and backup device driver 312. A device driver is a program routine that links the operating system to a peripheral device. Device drivers are written by programmers who understand the hardware's command language and characteristics. The device driver contains the precise machine language necessary to perform the functions in the peripheral device as requested by an application. In this example, application 300, master network adapter 304, backup network adapter 306, network interface layer 308, and adapter device driver interface layer 309, along with master device driver 310 and backup device driver 312, are located in a data processing system, such as data processing system 200 in FIG. 2.

The mechanism of the present invention employs in these illustrative examples a software-based methodology at the network adapter device driver layer to facilitate rapid failover between two network adapters. In these examples, master network adapter 304 and backup network adapter 306 are Ethernet network adapters of the same type. By implementing the failover capability at the adapter device driver layer, failover times may be reduced to that of the millisecond range without the need for specialized adapter hardware or firmware as presently used.

In these examples, rapid Ethernet adapter port failover is implemented at the adapter device driver layer. In the illustrative examples, master network adapter 304 is identified to the system by a user or a system administrator as the "master" adapter, and another network adapter of the same type, backup network adapter 306, is identified as the "backup" adapter. Both network adapters are under the control of the master's instance of the adapter device driver. In this example, the instance is master device driver 310.

When master network adapter 304 is opened by network interface layer 308, master device driver 310 initializes the master network port as in the case of a "normal" adapter.

The opening of a network device is initiated by the network interface layer when a network interface is created by a system administrator. In the specific case of an opening of a port of the master network adapter, master device driver 310 performs a number of actions. These actions include, reserving host resources needed by the adapter device driver, such as system timers and interrupt handlers, and reserving host resources needed by the adapter hardware, such as transmit and receive data buffers and descriptors.

Initialization of the master network adapter hardware is performed using the programming interface designed by the adapter hardware vendor in order to prepare the master network adapter for operation. The master adapter device driver also attempts to locate the backup device driver or backup device. If this device is not located the user is notified of an erroneous configuration. In this situation the master port has no available backup device to failover to.

Initialization of the backup network adapter hardware also occurs using the programming interface designed by the adapter hardware vendor in order to prepare the backup adapter for operation (with the exception of activating the transmit and receive functions of the backup adapter).

In summary, a software port, also referred to as a logical port is opened through adapter device driver layer 309 to transfer data to a hardware port in a network adapter, such as master network adapter 304. If a failure occurs in this adapter, adapter device driver layer 309 then maps the logical port to another hardware port, such as a hardware port in backup network adapter 306. The layers above adapter device driver layer 309 are unaware of the mapping changes and continue to send data to the logical port.

Some changes to currently used device drivers are needed for master device driver 310 to control both network adapters. These changes include program mechanism to locate the backup adapter that was designated by the system administrator. Programming a mechanism to access the hardware-specific attributes of the backup adapter such as the port MAC address, adapter I/O base address, adapter interrupt level, etc. A program mechanism is included to detect adapter or network failures which will in turn trigger a failover operation. Another mechanism is included in the device driver to assign the next active transmit and receive descriptor entries in use by master network adapter 304 to backup network adapter 306.

Master device driver 310 also identifies master network adapter 304 as a "master", and then locates the "backup" adapter's driver instance, backup device driver 312. In locating backup device driver 312, allocated system resources, such as bus memory space, bus I/O space, and interrupt level for backup network adapter 306, is identified. Master device driver 310 then initializes backup network adapter 306.

In initializing backup network adapter 306, master device driver 310 performs assignment of backup network adapter 306's source media access control (MAC) address, which is identical to the MAC address of master network adapter 304. A MAC address is a hardware address that uniquely identifies each node in a network. In these examples, the nodes may be network adapters. Further, master device driver 310 also programs the backup network adapter to use the descriptor and data buffer resources that have been previously allocated to the master adapter.

The descriptor and data buffer resources are host memory resources that have been reserved by the device driver for use by the network adapter. The network adapter transmits and receives data using descriptor/data buffer pairs. Each descriptor contains a reference or pointer to a corresponding data buffer, as well as control fields that enable the adapter to indicate to the device driver that a given descriptor has been processed, etc. The data buffers contain the actual network data that is being transmitted or received.

Further, the link of the backup network adapter is activated. This activation initiated by master device driver 310 occurs in a manner that leaves the transmit (TX) and receive (RX) engines in an "off" state, such that data traffic does not flow on backup network adapter 306. When master device driver 310 detects a failure on master network adapter 304, master device driver 310 initiates a failover action to backup network adapter 306. This failure may be detected in a number of different ways. For example, a failure may be identified when a link down interrupt is detected. Other examples of adapter failures include a transmit timeout, a PCI bus error, and an explicit hardware error or network error indication.

With a transmit timeout, the adapter is unable to process a transmit request from the device driver. In the case of a PCI bus error, an error such as an address parity error, on the PCI bus between the host and the network adapter can be detected by the device driver (depends on the host system architecture, not all system platforms have this capability). Another example is an explicit hardware error or network error indication from the network adapter, such as an adapter memory failure, adapter processor failure, ring failure (token-ring), ring beaconing (token-ring), etc. Since backup network adapter 306 was previously initialized as described above, master device driver 310 simply programs backup network adapter 306 to use the next active descriptor entries for transmit and receive data and activates backup network adapter 306's transmit and receive engines.

Master device driver 310 performs programming by communications with backup network adapter 306 using the architected interface defined by the adapter vendor to inform backup network adapter 306 of the location of the next active descriptor entries to use. The specific commands vary from adapter to adapter, but typically consist of one or more stores to specific adapter registers, in order to set the required command bits, descriptor index or pointer values, etc. A standard programming interface is present for all network adapters. As a result, the commands used depend on the particular implementation.

In addition, if no pending transmit data is present at the time of the failover, master device driver 310 will "spoof" a single address resolution protocol (ARP) request packet in order to trigger an external Ethernet switch, such as switch 314 to update it's internal MAC address table so that any incoming packets destined for master network adapter 304's MAC address will be properly switched to the backup adapter's port. Spoofing is performed to "fool" switch 314 into thinking that the request packet generated is for a transfer of data even though no data is pending for transfer. Address Resolution Protocol is a network layer protocol used to convert an Internet Protocol (IP) address into a physical address, such as an Ethernet address. A host wishing to obtain a physical address broadcasts an ARP request onto the TCP/IP network. The host on the network that has the IP address in the request then replies with its physical hardware address.

With the mechanism of the present invention, the enqueued data for transmit and receive remains in proper order from the device driver's point of view, and the failover action is completely transparent to software layers that reside above network interface layer 308. With the present invention, the failover function is totally compatible with many types of protocols and architectures, such as Etherchannel, Link Aggregation, or other high-level software features.

With reference now to FIG. 4, a flowchart of a process for initializing network adapters is depicted in accordance with a preferred embodiment of the present invention. The process illustrated in FIG. 4 may be implemented in a device driver, such as master device driver 310 in FIG. 3.

The process begins by initializing a master network port (step 400). A number of steps occur during initialization of the master network port. For example, host resources needed by the adapter device driver are reserved. These host resources include, for example, system timers and interrupt handlers. Host resources needed by the adapter hardware are reserved. These host resources include, for example, transmit and receive data buffers and descriptors. The master network adapter is initialized by programming the master adapter hardware using the programming interface designed by the adapter hardware vendor in order to prepare the master adapter for operation.

The final result is that the port (and in the case of the master port, it's associated device driver) are ready to transmit and receive network data. As used in these examples, the master network port is a "software" port, since this port actually controls both the master and backup adapters, and since the layers above the adapter device driver layer have no view or knowledge of the backup adapter port. The device driver maps the software port to a hardware port in the network adapters. In other words, a logical to physical mapping of ports is provided.

Next, a network adapter is identified as the master network adapter (step 402). Then, a backup device driver is located (step 404). Next, the backup network adapter is initialized (step 406) with the process terminating thereafter.

With reference now to FIG. 5, a flowchart of a process for initializing a backup network adapter is depicted in accordance with a preferred embodiment of the present invention. The process illustrated in FIG. 5 may be implemented in a device driver, such as master device driver 310 in FIG. 3.

The process begins by assigning a MAC address to the backup network adapter that is identical to the MAC address for the master network adapter (step 500). Next, the backup network adapter is programmed to use descriptor and data buffer resources allocated to the master network adapter (step 502). Then, the backup network adapter link is activated with transmit and receive engines in an off state (step 504) with the process terminating thereafter.

With reference now to FIG. 6, a flowchart of a process for performing a failover action is depicted in accordance with a preferred embodiment of the present invention. The process illustrated in FIG. 6 may be implemented in a device driver, such as master device driver 310 in FIG. 3.

The process begins by determining whether a failure is detected (step 600). If failure is detected, then the backup network adapter is programmed to use the next active descriptor entries for transmit and receive data (step 602). Next, transmit and receive engines are activated (step 604). A determination is made as to whether a pending transmit data is present (step 606). If pending transmit data is present, then the process terminates thereafter.

Referring back to step 600 if failure is not detected the process returns to step 600 as described above. In step 606, if pending transmit data is not present, an ARP request packet is spoofed (step 608) with the process terminating thereafter. The spoofing of the request packets occurs to cause a MAC address table in an external switch to be updated to cause data packets destined for the master network adapter MAC address to be properly switched to the port of the backup network adapter.

Thus, the present invention provides an improved method, apparatus, and computer instructions for providing a rapid or high-speed failover from a failed network adapter to a backup network adapter. The mechanism of the present invention implements the failover processes in a network interface layer. For example, the processes may be placed in a network device driver. The mechanism of the present invention maps data from a software port in the adapter device driver layer to a hardware port in a master or first network adapter. If a failure in the master network adapter occurs, the software port is then mapped to a hardware port for a backup network adapter.

Additionally, in the illustrative examples, the backup device driver is implemented to provide hardware information to the master network device driver. Depending on the particular implementation, backup device drivers are unnecessary and all of the features may be implemented in a single device driver.

The failover time may be identified from the following: (1) time for adapter to detect a failure, such as a link down event and generate and interrupt to the host; (2) time for the host to service the interrupt and dispatch the adapter device driver's interrupt handler; (3) time for the device driver to program the failing adapter to halt TX/RX engines; and (4) time for the device driver to program the backup adapter's TX and RX descriptor index values and activate TX/RX engines. With the mechanism of the present invention, the time for the processes are faster than those in currently available solutions.

Additionally, the mechanism of the present invention allows for a failover action to occur from the backup network adapter to the master network adapter. For example, if a failover action occurs and data is transferred using the backup network adapter and a failure occurs in the backup network adapter, the mechanism of the present invention may use the processes described above to initiate a failover action from the backup network adapter back to the master network adaper. Further, the mechanism of the present invention may be applied to more than two network adapters. In this case, failover may proceed from one network adapter to another network adapter in a group of network adapters. In another example, multiple master network adapters may share one or more backup network adapters using the mechanism of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include: recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for facilitating failover between network adapters, the method comprising:
   opening a logical port by a device driver layer to transfer data to a first hardware port in a first network adapter;
   detecting a failure of the first network adapter in the device driver layer; and
   responsive to detecting the failure, mapping the logical port by the device driver layer to a second hardware port in a second network adapter to change the transfer of the data to the second hardware port.

2. The method of claim 1, wherein the first network adapter and the second network adapter are Ethernet network adapters.

3. The method of claim 1, wherein the second network adapter is previously initiated.

4. The method of claim 1 further comprising:
   initializing the second network adapter when the first network adapter is initialized.

5. A method in a device driver layer in a data processing system for facilitating failover between network adapters, the method comprising:

responsive to opening a logical port to a first hardware port in a master network adapter by the device driver layer, initializing a backup network adapter; and responsive to detecting a failure in the master network adapter in the device driver layer, initiating a failover action to map the logical port to a second hardware port in the backup network adapter.

6. The method of claim 5, wherein the initializing step includes:

assigning a first media access control address to the backup network adapter, wherein a media access control address is identical to a second media access control address for the master network adapter.

7. The method of claim 6, wherein the initializing step further includes:

programming the backup network adapter to use resources allocated to the master network adapter, wherein the resources are transmit and receive data buffers and descriptors.

8. The method of claim 7, wherein the initializing step further includes:

activating a link of the backup network adapter such that a transmit engine and a receive engine in the backup network adapter is in a state in which no data traffic flows on the backup network adapter.

9. The method of claim 8, wherein the failover action includes programming the backup network adapter to use a next active descriptor entry for transmit data and receive data and activating the transmit engine and the receive engine.

10. The method of claim 6 further comprising:

responsive to an absence of pending transmit data at a time when the failover action occurs, spoofing a single request packet to trigger an update to a media access control address table to allow incoming packets destined for the second media access control address to a port for the backup network adapter.

11. A data processing system for facilitating failover between network adapters, the data processing system comprising:

opening means for opening a logical port by a device driver layer to transfer data to a first hardware port in a first network adapter;

detecting means for detecting a failure of the first network adapter in the device driver layer; and mapping means, responsive to detecting the failure, for mapping the logical port by the device driver layer to a second hardware port in a second network adapter to change the transfer of the data to the second hardware port.

12. The data processing system of claim 11, wherein the first network adapter and the second network adapter are Ethernet network adapters.

13. The data processing system of claim 11, wherein the second network adapter is previously initiated.

14. The data processing system of claim 11 further comprising:

initializing means for initializing the second network adapter when the first network adapter is initialized.

15. A device driver layer in a data processing system for facilitating failover between network adapters, the device driver layer comprising:

initializing means, responsive to opening a logical port to a first hardware port in a master network adapter by the device driver layer, for initializing a backup network adapter; and initiating means, responsive to detecting a failure in the master network adapter in the device driver layer, for initiating a failover action to map the logical port to a second hardware port in the backup network adapter.

16. The device driver layer of claim 15, wherein the initializing means includes:

assigning means for assigning a first media access control address to the backup network adapter, wherein a media access control address is identical to a second media access control address for the master network adapter.

17. The device driver layer of claim 16, wherein the initializing means further includes:

programming means for programming the backup network adapter to use resources allocated to the master network adapter, wherein the resources allocated are transmit and receive data buffers and descriptors.

18. The device driver layer of claim 17, wherein the initializing means further includes:

activating means for activating a link of the backup network adapter such that a transmit engine and a receive engine in the backup network adapter is in a state in which no data traffic flows on the backup network adapter.

19. The device driver layer of claim 18, wherein the failover action includes programming the backup network adapter to use a next active descriptor entry for transmit data and receive data and activating the transmit engine and the receive engine.

20. The device driver layer of claim 16 further comprising:

spoofing means, responsive to an absence of pending transmit data at a time when the failover action occurs, for spoofing a single request packet to trigger an update to a media access control address table to allow incoming packets destined for the second media access control address to a port for the backup network adapter.

21. A computer program product in a computer readable recordable-type medium for facilitating failover between network adapters, the computer program product comprising:

first instructions for opening a logical port by a device driver layer to transfer data to a first hardware port in a first network adapter;

second instructions for detecting a failure of the first network adapter in the device driver layer; and third instructions, responsive to detecting the failure, for mapping the logical port by the device driver layer to a second hardware port in a second network adapter to change the transfer of the data to the second hardware port.

22. The computer program product of claim 21, wherein the first network adapter and the second network adapter are Ethernet network adapters.

23. The computer program product of claim 21, wherein the second network adapter is previously initiated.

24. The computer program product of claim 21 further comprising:

fourth instructions for initializing the second network adapter when the first network adapter is initialized.

25. A computer program product for a device driver layer in a computer readable recordable-type medium for facilitating failover between network adapters, the computer program product comprising:

first instructions, responsive to opening a logical port to a first hardware port in a master network adapter by the device driver layer, for initializing a backup network adapter; and second instructions, responsive to detecting a failure in the master network adapter in the device driver layer, for initiating a failover action to map the logical port to a second hardware port in the backup network adapter.

26. The computer program product of claim 25, wherein the first instructions includes:

sub-instructions for assigning a first media access control address to the backup network adapter, wherein a media access control address is identical to a second media access control address for the master network adapter.

27. The computer program product of claim 26, wherein the sub-instructions in the first instructions are first sub-instructions and further includes:

second sub-instructions for programming the backup network adapter to use resources allocated to the master network adapter, wherein the resources allocated are transmit and receive data buffers and descriptors.

28. The computer program product of claim 27, wherein the sub-instructions in the first instructions are second sub-instructions and further includes:

third sub-instructions for activating a link of the backup network adapter such that a transmit engine and a receive engine in the backup network adapter is in a state in which no data traffic flows on the backup network adapter.

29. The computer program product of claim 28, wherein the failover action includes programming the backup network adapter to use a next active descriptor entry for transmit data and receive data and activating the transmit engine and the receive engine.

30. The computer program product of claim 26 further comprising:

third instructions, responsive to an absence of pending transmit data at a time when the failover action occurs, for spoofing a single request packet to trigger an update to a media access control address table to allow incoming packets destined for the second media access control address to a port for the backup network adapter.

31. A data processing system comprising:

a bus system;

a memory connected to the bus system, wherein the memory includes a set of instructions; and a processing unit connected to the bus system, wherein the processing unit executes a set of instructions to open a logical port by a device driver layer to transfer data to a first hardware port in a first network adapter; detect a failure of the first network adapter in the device driver layer; and map the logical port by the device driver layer to a second hardware port in a second network adapter to change the transfer of the data to the second hardware port, in response to detecting the failure.

32. A data processing system comprising:

a bus system;

a memory connected to the bus system, wherein the memory includes a set of instructions; and a processing unit to the bus system, wherein the processing unit executes a set of instructions for a device driver layer to initialize a backup network adapter, in response to opening a logical port to a first hardware port in a master network adapter by the device driver layer; and initiate a failover action to map the logical port to a second hardware port in the backup network adapter, in response to detecting a failure in the master network adapter in the device driver layer.

* * * * *